(12) United States Patent
Arihara et al.

(10) Patent No.: US 10,612,970 B2
(45) Date of Patent: Apr. 7, 2020

(54) DEVICE FOR MEASURING DYNAMIC CHARACTERISTICS OF CENTRIFUGAL ROTATING MACHINE

(71) Applicant: Kobe Steel, Ltd., Hyogo (JP)

(72) Inventors: Hirotoshi Arihara, Kobe (JP); Komei Fujioka, Takasago (JP); Yuki Kameyama, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 149 days.

(21) Appl. No.: 15/754,653

(22) PCT Filed: Sep. 13, 2016

(86) PCT No.: PCT/JP2016/076970
§ 371 (c)(1),
(2) Date: Feb. 23, 2018

(87) PCT Pub. No.: WO2017/047582
PCT Pub. Date: Mar. 23, 2017

(65) Prior Publication Data
US 2018/0252576 A1  Sep. 6, 2018

(30) Foreign Application Priority Data

Sep. 14, 2015  (JP) .................................. 2015-180798

(51) Int. Cl.
*G01H 11/02* (2006.01)
*F04D 29/28* (2006.01)
(Continued)

(52) U.S. Cl.
CPC ............. *G01H 11/02* (2013.01); *F04D 17/10* (2013.01); *F04D 17/105* (2013.01);
(Continued)

(58) Field of Classification Search
CPC ....... G01H 11/02; F04D 17/105; F04D 29/66; G01M 13/028; F05B 2260/964; F05B 2270/334; F05B 2270/821
(Continued)

(56) References Cited

U.S. PATENT DOCUMENTS

| 3,526,128 A * | 9/1970 | Borisenko ............... G01H 1/006 |
| | | 73/654 |
| 5,149,253 A * | 9/1992 | Miyamoto ........... F04D 13/0646 |
| | | 310/156.21 |
| 2015/0285672 A1 | 10/2015 | Arihara | |

FOREIGN PATENT DOCUMENTS

JP  2014-102117 A  6/2014

OTHER PUBLICATIONS

International Search Report issued in PCT/JP2016/076970; dated Dec. 20, 2016.

* cited by examiner

*Primary Examiner* — Lisa M Caputo
*Assistant Examiner* — Rose M Miller
(74) *Attorney, Agent, or Firm* — Studebaker & Brackett PC

(57) ABSTRACT

A centrifugal rotating machine includes a rotor in which impellers are attached to the axial ends of a rotating shaft that extends in the axial direction, said impellers rotating in a rotating direction around the rotating shaft so as to draw in fluid from an intake side in the axial direction and discharge fluid from the outer side thereof in the radial direction. According to this device for measuring dynamic characteristics of said centrifugal rotating machine, a cover for covering an impeller is attached to a region of the impeller other than an intake opening on the intake side thereof, and (Continued)

a magnetic force generator for vibrating the impeller by magnetic force is disposed so as to face the cover.

20 Claims, 20 Drawing Sheets

(51) Int. Cl.
*F04D 29/66* (2006.01)
*F04D 17/10* (2006.01)
*G01H 17/00* (2006.01)
*F04D 25/02* (2006.01)
*F04D 27/00* (2006.01)
*F04D 29/053* (2006.01)
*G01M 13/028* (2019.01)

(52) U.S. Cl.
CPC ......... *F04D 25/024* (2013.01); *F04D 27/001* (2013.01); *F04D 29/053* (2013.01); *F04D 29/284* (2013.01); *F04D 29/66* (2013.01); *G01H 17/00* (2013.01); *G01M 13/028* (2013.01); *F05B 2260/964* (2013.01); *F05B 2270/334* (2013.01); *F05B 2270/821* (2013.01)

(58) Field of Classification Search
USPC .......................................................... 73/660
See application file for complete search history.

F I G. 12
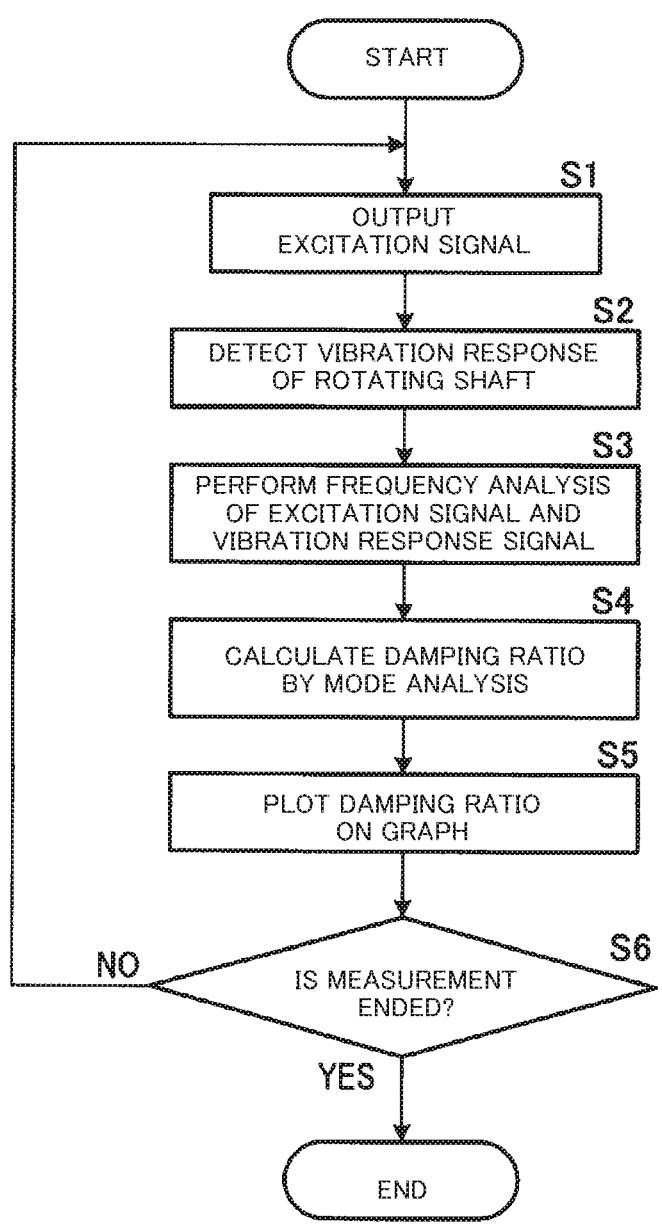

DEVICE FOR MEASURING DYNAMIC CHARACTERISTICS OF CENTRIFUGAL ROTATING MACHINE

TECHNICAL FIELD

The present invention relates to a device for measuring dynamic characteristics of a centrifugal rotating machine.

BACKGROUND ART

A centrifugal rotating machine including a rotor with an impeller mounted on a shaft end portion of a rotating shaft is known, for example. In a centrifugal compressor, an example of the centrifugal rotating machine, the exciting force of a high-pressure gas acting on a rotor can cause the rotor to produce self-excited vibrations, leading to the necessity to stop the compressor. Whether the rotor produces self-excited vibrations depends on the damping ratio of the rotor (shaft vibration system). It is known that a rotor having a damping ratio of a positive value does not produce self-excited vibrations, and the larger the value of the damping ratio, the less the rotor is prone to produce self-excited vibrations, and the more the rotor is stable.

Thus, in order to stably operate a centrifugal rotating machine, it is important to properly grasp the damping ratio of a rotor. Patent Document 1 discloses a dynamic characteristic measurement device that is provided with magnetic force generators for exciting impellers by magnetic force, and calculates dynamic characteristics of a rotor with the rotor excited by the magnetic force generators. By determining the damping ratio or the like of a rotor, using such a dynamic characteristic measurement device, the stability of the rotor can be evaluated.

CITATION LIST

Patent Document

Patent Document 1: JP 2014-102117 A

SUMMARY OF THE INVENTION

Technical Problem

In Patent Document 1, magnetic force generators for exciting an impeller by magnetic force are provided on the back side (opposite to the suction side) of the impeller. This arrangement is effective when the diameter of the impeller is sufficiently larger than that of a seal provided on the back side of the impeller, and there is an empty space on the back side of the impeller. However, in a multistage compression type centrifugal compressor, for example, a rotor in a higher-pressure stage has an impeller of a smaller diameter because the volume of gas sucked is smaller. In addition, a relatively large dry gas seal or the like is used as a seal against a higher pressure. This can prevent magnetic force generators from being properly arranged on the back side of the impeller.

The present invention has been made in view of the above circumstances, and its object is to suitably place magnetic force generators in a device for measuring dynamic characteristics of a centrifugal rotating machine that includes a rotor with an impeller mounted on a shaft end portion of a rotating shaft, even when the magnetic force generators cannot be arranged on the back side of the impeller.

Solution to Problem

An aspect of the present invention provides a device for measuring dynamic characteristics of a centrifugal rotating machine that includes a rotor with an impeller mounted on a shaft end portion of a rotating shaft extending in an axial direction, the impeller rotating in a rotational direction around the rotating shaft to suck fluid from an inlet on a suction side in the axial direction and discharge the fluid from an outer side in a radial direction. The device includes magnetic force generators that excite the impeller by magnetic force, an excitation controller that drives the magnetic force generators, a vibration detector that detects vibrations of the rotating shaft, and an arithmetic unit that performs frequency analysis and mode analysis based on an excitation signal from the excitation controller and a vibration signal from the vibration detector to calculate dynamic characteristics of the rotor. A cover covering the impeller is attached to a region of the suction side of the impeller other than the inlet, and the magnetic force generators are disposed opposite to the cover.

Advantageous Effect of the Invention

According to the aspect of the present invention, the magnetic force generators are disposed opposite to the cover attached to the suction side of the impeller. Thus, by the magnetic force generators exerting magnetic attractive force on the cover, the impeller can be excited by magnetic force. Typically, various machine components such as a seal and a bearing are disposed on the back side (opposite to the suction side) of the impeller, whereas such machine components are not often disposed in a region opposite to the cover. Therefore, even when the magnetic force generators cannot be disposed on the back side of the impeller, the magnetic force generators can be placed suitably.

BRIEF DESCRIPTION OF DRAWINGS

FIG. 12 is a flowchart of dynamic characteristic measurement on the rotor.

DESCRIPTION OF EMBODIMENTS

An embodiment of the present invention will be described with reference to the drawings. Hereinafter, an example where a dynamic characteristic measurement device according to the present invention is applied to a built-in gear type centrifugal compressor is presented. The dynamic characteristic measurement device according to the present invention can be applied to various centrifugal rotating machines that include a rotor with an impeller mounted on a shaft end portion of a rotating shaft for compressing or force-feeding fluid. For example, the dynamic characteristic measurement device according to the present invention can be applied to centrifugal pumps and centrifugal fans in addition to centrifugal compressors.

<Configuration of Built-in Gear Type Centrifugal Compressor>

Figure 1:
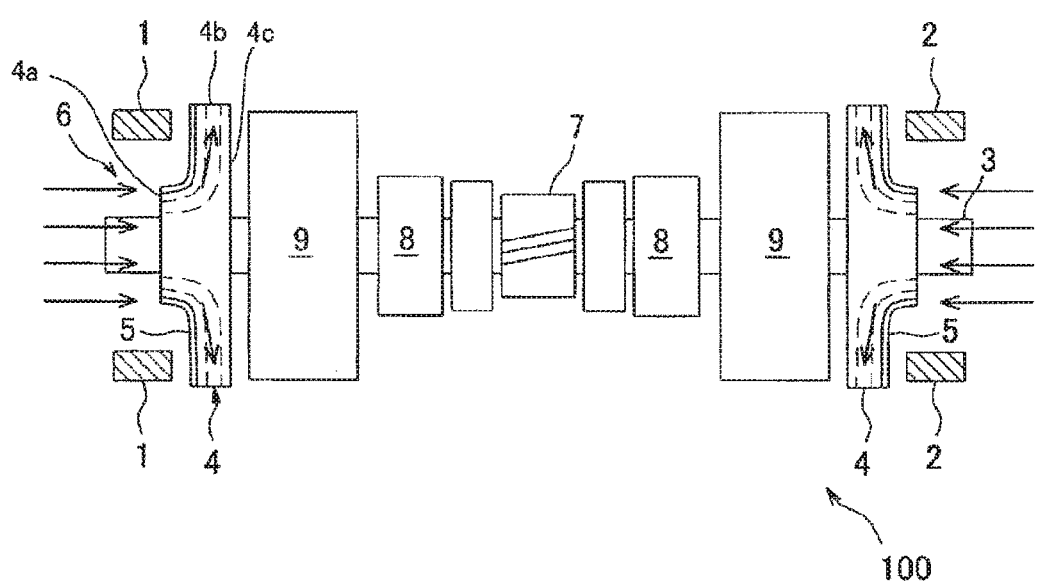
FIG. 1 is a side view schematically showing a centrifugal compressor according to an embodiment.

As shown in FIG. 1, a built-in gear type centrifugal compressor 100 includes a rotor 6 that has a rotating shaft 3 extending in an axial direction and two impellers 4 mounted on both end portions of the rotating shaft 3, individually. By the impellers 4 rotating in a predetermined rotational direction, gas is sucked from inlets 4a opening on the side of the shaft center of the rotating shaft 3 into the impellers 4 on the suction side in the axial direction as shown by arrows in FIG. 1. The sucked gas flows in centrifugal directions while being compressed by the impellers 4, and the compressed gas is discharged from radially outer outlets 4b of the impellers 4. A cover 5 for covering each impeller 4 is attached to the suction side of the impeller 4 (an annular region with the inlet 4a left, opposite to a back surface 4c of the impeller 4).

A gear 7 (pinion gear) is provided at a central portion of the rotating shaft 3 between the two impellers 4. The gear 7 is engaged with a large gear (not shown) having a larger diameter than the gear 7. The rotor 6 is rotated via the gear 7. Bearings 8 for rotatably supporting the rotating shaft 3 are placed on opposite sides of the gear 7 between the two impellers 4. A seal 9 for preventing leakage of compressed gas is placed between the bearing 8 and the impeller 4 on each side. Machine components including the rotor 6 are housed in a casing not shown.

FIG. 1 illustrates the built-in gear type centrifugal compressor 100 including only the one rotor 6 with the gear 7, the bearings 8, the seals 9, and others mounted thereon. A multistage compression type centrifugal compressor formed with a plurality of rotors 6 each with the gear 7, the bearings 8, the seals 9, and others mounted thereon is known. In such a multistage compression type centrifugal compressor, a rotor 6 in a higher-pressure stage has an impeller 4 of a smaller diameter because the volume of gas sucked is smaller, and uses a relatively large dry gas seal or the like as a seal 9 against a higher pressure. Thus, when it is difficult to arrange magnetic force generators on the back side of each impeller 4, the present invention can be applied suitably as shown in FIG. 1.

<Disposition of Magnetic Force Generators>

In the present embodiment, a plurality of magnetic force generators 1 and 2 for exciting the impellers 4 by magnetic force is disposed opposite to the covers 5 for the impellers 4. Here, the magnetic force generators 1 are provided for the impeller 4 on the left side in FIG. 1, and the magnetic force generators 2 are provided for the impeller 4 on the right side in FIG. 1.

Figure 2:
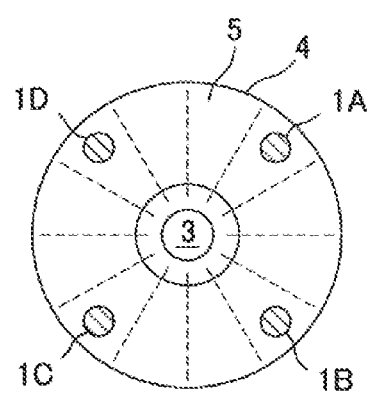
FIG. 2 is an arrangement diagram of magnetic force generators as viewed from an axial direction.

FIG. 2 is an arrangement diagram of the magnetic force generators 1 as viewed from an axial direction, showing the arrangement of the magnetic force generators 1 as viewed from the left side in FIG. 1. In the present embodiment, for the impeller 4 on the left side in FIG. 1, four magnetic force generators 1 (magnetic force generators 1A to 1D) are arranged at 90 degree intervals in a rotational direction of the impeller 4. Likewise, for the impeller 4 on the right side in FIG. 1, four magnetic force generators 2 (magnetic force generators 2A to 2D) are arranged at 90 degree intervals in a rotational direction of the impeller 4 (see FIG. 11B). The magnetic force generators 1A and 2A, the magnetic force generators 1B and 2B, the magnetic force generators 1C and 2C, and the magnetic force generators 1D and 2D are located in the same position when viewed from an axial direction.

Figure 3:
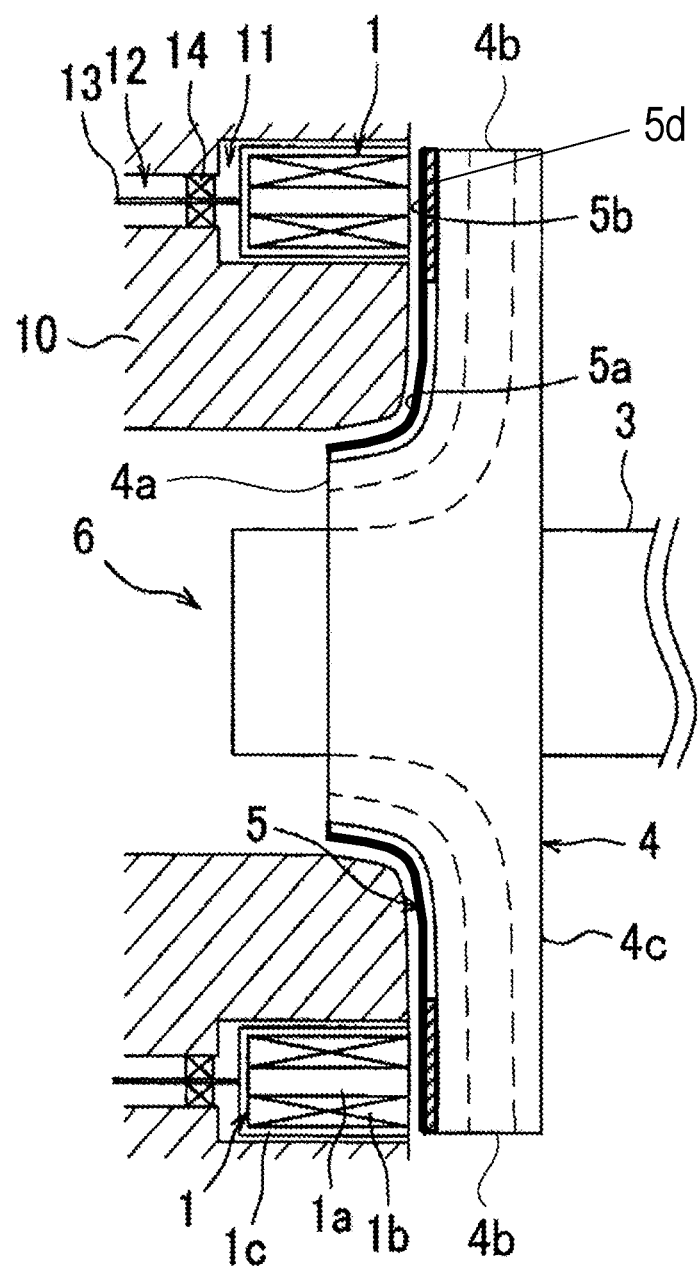
FIG. 3 is a side view showing details of the magnetic force generators.

FIG. 3 is a side view showing details of the magnetic force generators 1. Since the magnetic force generators 2 have the same configuration as the magnetic force generators 1, the magnetic force generators 1 will be described below. The magnetic force generators 1 can preferably vary the magnitude of magnetic force generated. For example, an electromagnet with a coil 1b wound on an iron core 1a, covered by a cylindrical yoke 1c is suitable. The magnetic force generators 1 are each housed in a recessed housing 11 formed in a position opposite to the cover 5 in the casing 10 that houses the rotor 6. In the casing 10, wiring spaces 12 communicating with the housings 11 are formed. Wiring 13 for supplying electricity to the magnetic force generators 1 is disposed in the wiring spaces 12. A seal 14 is provided between an inner wall surface of each wiring space 12 and the wiring 13 for preventing gas from leaking outside through the wiring space 12.

In the present embodiment, the magnetic force generators 1 are disposed along the axial direction to be opposite to an outer peripheral edge portion 5b of a suction-side surface 5a of the cover 5 (portions shown by thick lines in FIG. 3). The expression "the magnetic force generators 1 are disposed along the axial direction" means that the magnetic force generators 1 are disposed such that the longitudinal direction of the magnetic force generators 1 (the axial direction of the iron cores 1a) is substantially parallel to the axial direction of the rotating shaft 3.

Figure 19:
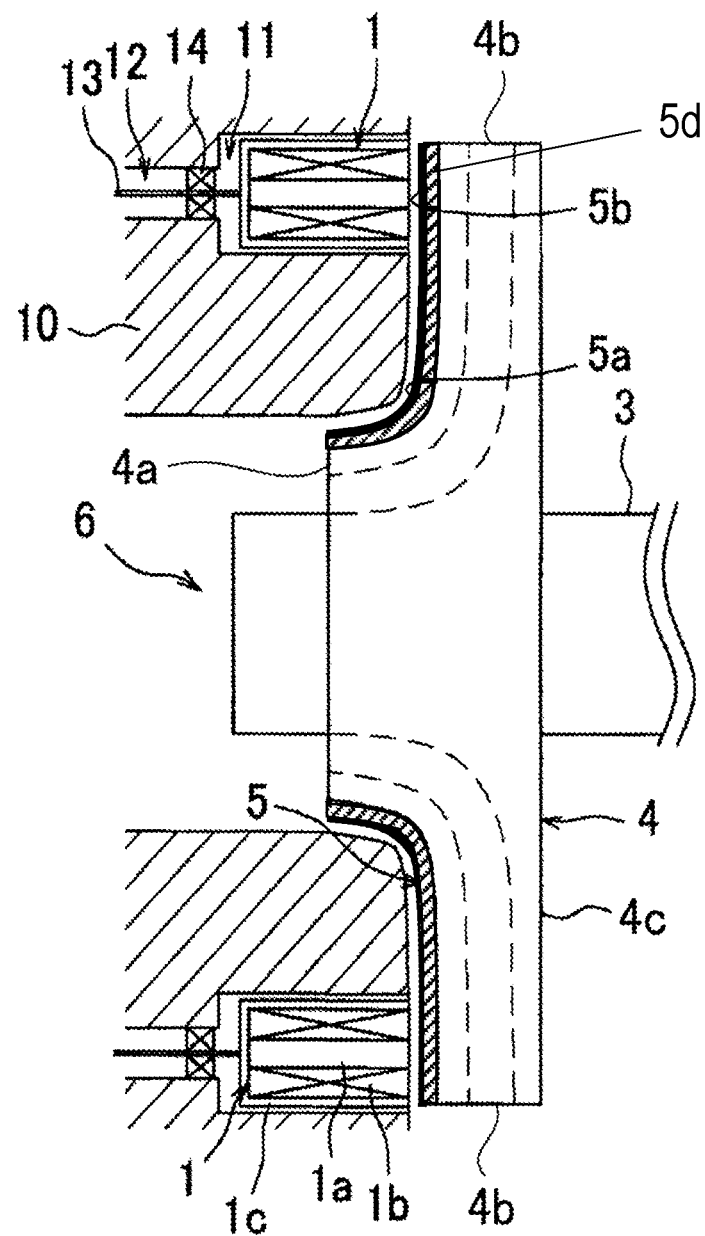
FIG. 19 is a side view showing details of the magnetic force generators.

The material of the cover 5 is desirably a magnetic substance on which magnetic attractive force acts, or a good conductor in which eddy currents occur. The magnetic substance may be iron, stainless having magnetic properties, or the like. The good conductor may be aluminum, an aluminum alloy, copper, or the like. Alternatively, a member 5d made of a magnetic substance or a good conductor may be attached to the suction side of the cover 5, thereby widening material choices for the cover 5. FIG. 19 shows another embodiment in which the member 5d is wider than the member 5d in FIG. 3.

Figure 4A:
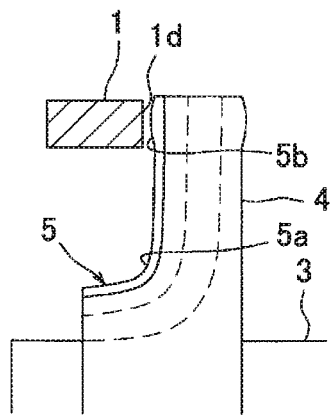
FIG. 4A is a side view showing a magnetic force acting surface and a magnetic force acted-on surface.

Here, as shown in FIG. 4A, the outer peripheral edge portion 5b of the cover 5 may be formed in a protruding shape to be slightly thicker in view of centrifugal force balance, strength, and others. In such a case, if a magnetic force acting surface 1d of the magnetic force generator 1 opposite to the cover 5 (an end face of the magnetic force generator 1 in the longitudinal direction thereon is a flat surface, the distance between the magnetic force acting surface 1d and a magnetic force acted-on surface of the cover 5 opposite to the magnetic force acting surface 1d (the outer peripheral edge portion 5b in the present embodiment) is not uniform, creating a widened-gap portion between them. This can prevent magnetic attractive force generated by the magnetic force generator 1 from being efficiently exerted on the cover 5.

Figure 4B:
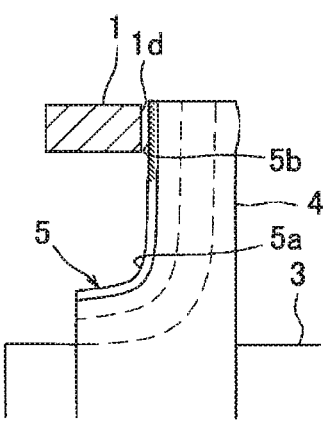
FIG. 4B is a side view showing the magnetic force acting surface and the magnetic force acted-on surface.
Figure 4C:
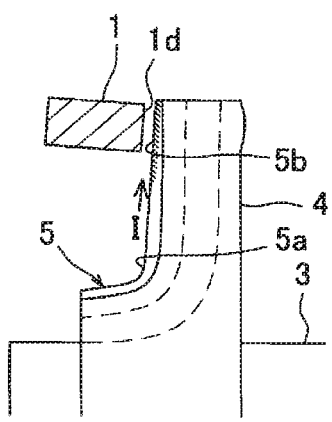
FIG. 4C is a side view showing the magnetic force acting surface and the magnetic force acted-on surface.

Thus, the distance between the magnetic force acting surface 1d of the magnetic force generator 1 and the magnetic force acted-on surface 5b of the cover 5 is preferably made uniform over the entire surfaces. Specifically, as shown in FIG. 4B, the magnetic force acted-on surface 5b of the cover 5 may be a flat surface orthogonal to the axial direction, and the magnetic force acting surface 1d of the magnetic force generator 1 may be a flat surface orthogonal to the axial direction. Alternatively, as shown in FIG. 4C, the magnetic force acted-on surface 5b of the cover 5 may be formed in a truncated cone shape, and the magnetic force generator 1 may be disposed at an angle from the axial direction so that the magnetic force acting surface 1d is in conformance with the magnetic force acted-on surface 5b. Alternatively, as shown in FIG. 4D, the magnetic force acted-on surface 5b of the cover 5 may be formed in a truncated cone shape, and the magnetic force acting surface 1d may be formed obliquely with respect to a plain orthogonal to the axial direction so that the magnetic force acting surface 1d is in conformance with the magnetic force acted-on surface 5b.

Figure 4D:
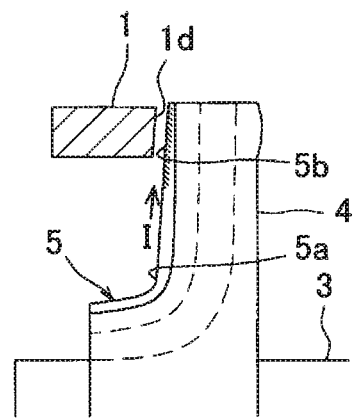
FIG. 4D is a side view showing the magnetic force acting surface and the magnetic force acted-on surface.
Figure 4E:
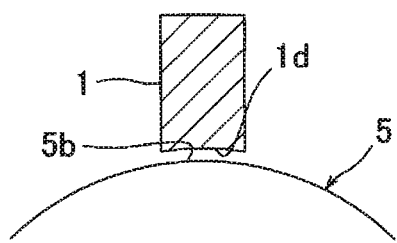
FIG. 4E is an explanatory diagram showing the magnetic force acting surface and the magnetic force acted-on surface as viewed from a direction I in FIGS. 4C and 4D.

FIG. 4E is a diagram showing the magnetic force acting surface 1d and the magnetic force acted-on surface 5b when viewed from a direction I in FIGS. 4C and 4D. When the magnetic force acted-on surface 5b of the cover 5 is formed in a truncated cone shape, by forming the magnetic force acting surface 1d of the magnetic force generator 1 in an arc shape as shown in FIG. 4E, the magnetic force acting surface 1d can be made in conformance with the magnetic force acted-on surface 5b also in a circumferential direction. Moreover, the degree of uniformity in the distance between the magnetic force acting surface 1d and the magnetic force acted-on surface 5b can be further improved. It is not essential to form the magnetic force acting surface 1d of the magnetic force generator 1 and the magnetic force acted-on surface 5b of the cover 5 as in FIGS. 4B to 4E. If those in FIG. 4A allow sufficient magnetic attractive force to be exerted on the cover 5, they may be used without change.

Here, in order to increase the magnetic attractive force of the magnetic force generators 1, it is conceivable that the cross-sectional area of the magnetic force generators 1 orthogonal to the longitudinal direction thereof (the axial direction of the iron cores 1a) may be increased. However, when the cross-sectional shape of the magnetic force generators 1 is circular as in FIG. 2, directly enlarging the circular cross-sectional shape causes the magnetic force generators 1 to partially extend off the outer edge of the cover 5. Thus, magnetic attractive force cannot be efficiently exerted on the cover 5, considering that the cross-sectional area of the magnetic force generators 1 is increased.

Figure 5A:
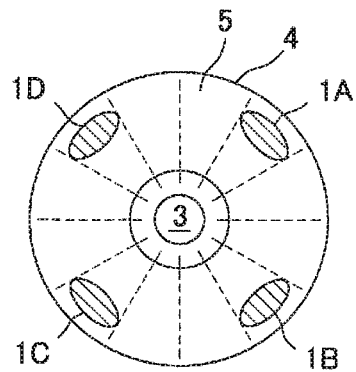
FIG. 5A is a cross-sectional view showing a cross-sectional shape of the magnetic force generators orthogonal to the longitudinal direction thereof.
Figure 5B:
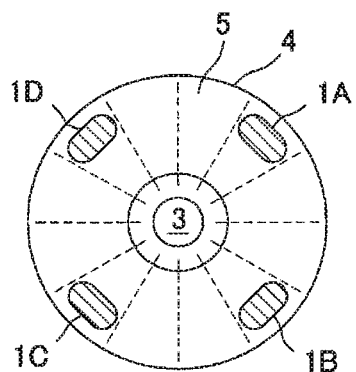
FIG. 5B is a cross-sectional view showing a cross-sectional shape of the magnetic force generators orthogonal to the longitudinal direction thereof.
Figure 5C:
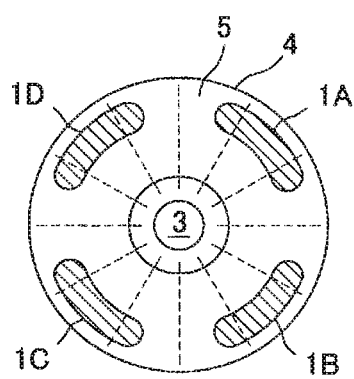
FIG. 5C is a cross-sectional view showing a cross-sectional shape of the magnetic force generators orthogonal to the longitudinal direction thereof.

Thus, as shown in FIGS. 5A to 5C, for example, the dimension of each magnetic force generator 1 (1A to 1D) in the rotational direction of the impeller 4 is preferably made larger than the dimension of the magnetic force generator 1 in a direction orthogonal to the rotational direction, that is, a radial direction in a cross section orthogonal to the longitudinal direction of the magnetic force generator 1. Specifically, the cross-sectional shape of each magnetic force generator 1 may be an elliptical shape having the major axis in the rotational direction and the minor axis in the radial direction as shown in FIG. 5A, or may be an oblong shape extending in the rotational direction as shown in FIG. 5B, or may be a fan shape extending in the rotational direction as shown in FIG. 5C. These cross-sectional shapes allow the cross-sectional area of each magnetic force generator 1 to be efficiently increased, preventing the magnetic force generator 1 from partially extending off the outer edge of the cover 5.

<Configuration of Dynamic Characteristic Measurement Device>

Figure 6:
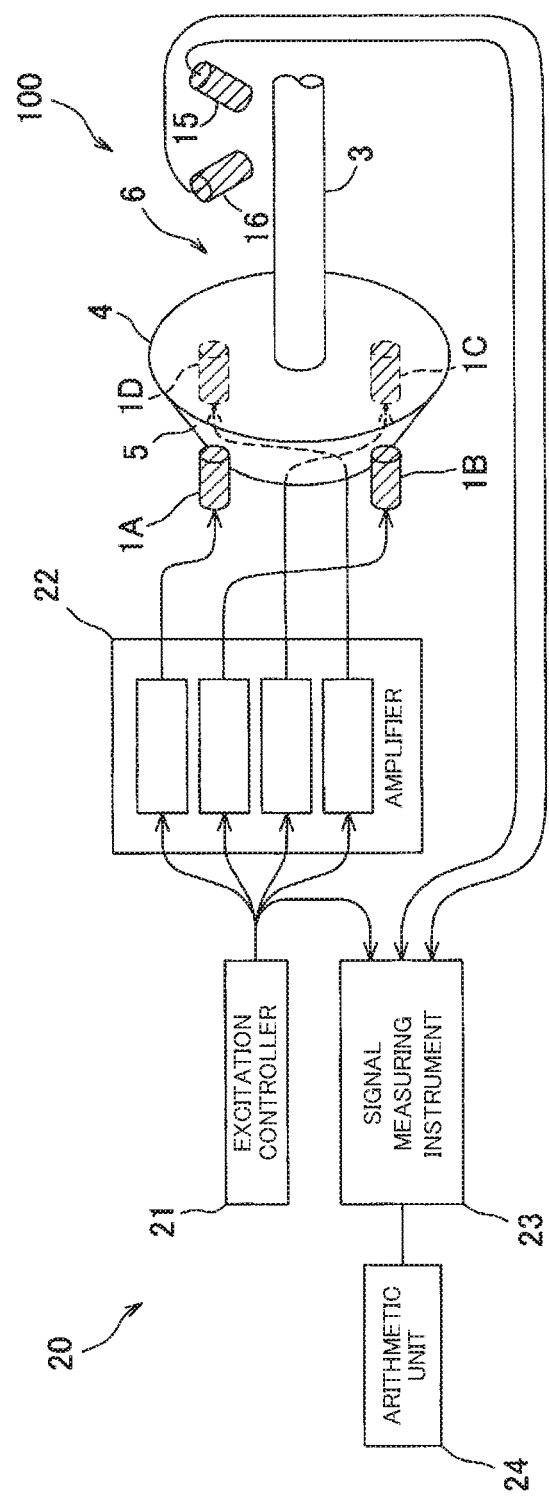
FIG. 6 is a configuration diagram of a dynamic characteristic measurement device provided in the centrifugal compressor according to the embodiment.

FIG. 6 is a configuration diagram of a dynamic characteristic measurement device 20 provided in the centrifugal compressor 100 according to the present embodiment. Only the configuration for the magnetic force generators 1 provided for the impeller 4 on the left side in FIG. 1 is described below. The configuration for the magnetic force generators 2 provided for the impeller 4 on the right side in FIG. 1 is the same.

The dynamic characteristic measurement device 20 includes the plurality of magnetic force generators 1 (1A to 1D), an excitation controller 21, an amplifier 22, vibration detectors 15 and 16, a signal measuring instrument 23, and an arithmetic unit 24. The excitation controller 21 outputs excitation signals for driving the magnetic force generators 1. The amplifier 22 amplifies excitation signals output from the excitation controller 21. The vibration detectors 15 and 16 detect vibrations of the rotating shaft 3. The signal measuring instrument 23 transfers excitation signals from the excitation controller 21 and vibration signals (detection signals) from the vibration detectors 15 and 16 to the arithmetic unit 24 to be described later. The arithmetic unit 24 performs frequency analysis and mode analysis based on excitation signals from the excitation controller 21 and vibration signals from the vibration detectors 15 and 16 to calculate dynamic characteristics of the rotor 6. The vibration detectors 15 and 16 are spaced 90 degrees apart in the rotational direction of the rotor 6 to be able to detect vibrations in two directions intersecting at right angles in a plane orthogonal to the axial direction.

<Patterns of Excitation by Magnetic Force Generators>

Patterns of excitation by the magnetic force generators 1 and 2 will be described. First, with reference to FIGS. 7A to 7C, a case where a rigid mode is excited will be described. The rigid mode is generally a vibration mode with less bending that occurs first when the rotor 6 vibrates. In contrast, a bending mode is, for example, a vibration mode with relatively large bending that occurs next to the rigid mode when the rotor 6 vibrates.

Figure 7A:
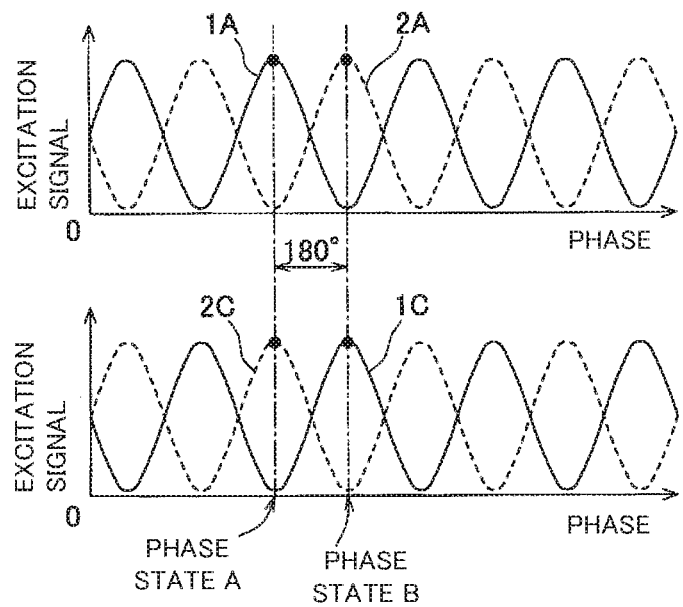
FIG. 7A is a graph showing waveforms of excitation signals when a rigid mode is excited.
Figure 7B:
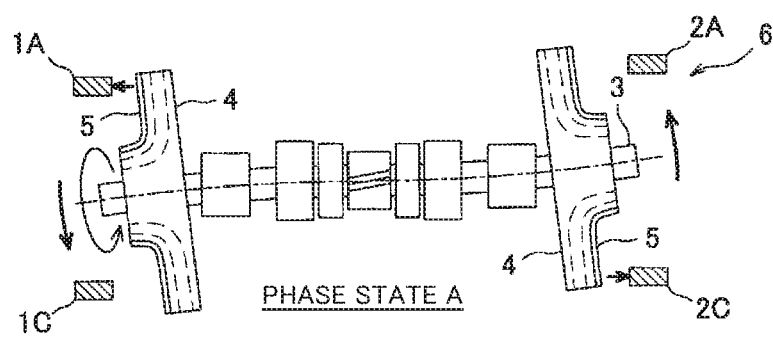
FIG. 7B is a side view of the centrifugal compressor showing how a rotor vibrates when the rigid mode is excited.
Figure 7C:
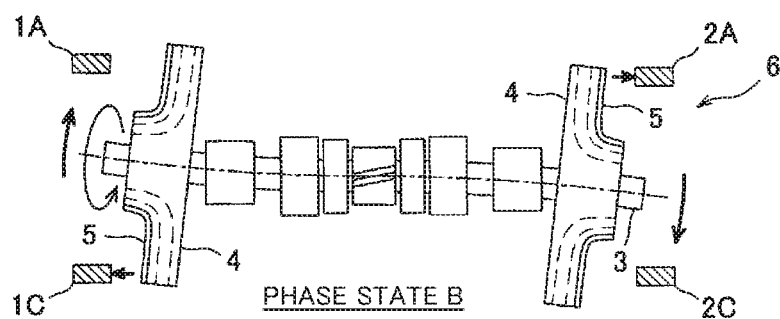
FIG. 7C is a side view of the centrifugal compressor showing how the rotor vibrates when the rigid mode is excited.

FIGS. 7B and 7C are diagrams showing how the rotor 6 vibrates when the rigid mode is excited. As shown in FIGS. 7B and 7C, in the rigid mode, both ends of the rotating shaft 3, for example, vibrate (swing) in opposite directions while rotating. This vibration mode is called the rigid mode.

FIG. 7A is a graph showing waveforms of excitation signals to the magnetic force generators 1A, B, 2A, and 2B when the rigid mode is excited. When the rigid mode is excited, the impellers 4 are each excited by a pair of magnetic force generators arranged at a 180 degree interval in the rotational direction of the impellers 4 (e.g. the magnetic force generators 1A and 10C and the magnetic force generators 2A and 2C).

A state in FIG. 7B and a state in FIG. 7C are referred to as a phase state A and a phase state B, respectively. It is shown in the graph in FIG. 7A in what states excitation signals to the magnetic force generators 1A, 1C, 2A and 2C are when the vibration state corresponds to the phase state A or the phase state B. As shown in FIG. 7A, by alternately operating each pair of magnetic force generators arranged at a 180 degree interval in the rotational direction of the rotor 6, that is, the magnetic force generators 1A and 1C and the magnetic force generators 2A and 2C while making excitation signals to each pair of magnetic force generators oppositely disposed in the axial direction of the rotor 6, that is, the magnetic force generators 1A and 2A and the magnetic force generators 1C and 2C in opposite phases (180 degrees out of phase), the rigid mode can be effectively excited.

Next, with reference to FIGS. 8A to 8C, a case where the bending mode is excited will be described. FIGS. 8B and 8C are diagrams showing how the rotor 6 vibrates when the bending mode is excited. As shown in FIGS. 8B and 8C, in the bending mode, the both ends of the rotating shaft 3, for example, vibrate (swing) in the same direction while rotating. This vibration mode is called the bending mode.

Figure 8A:
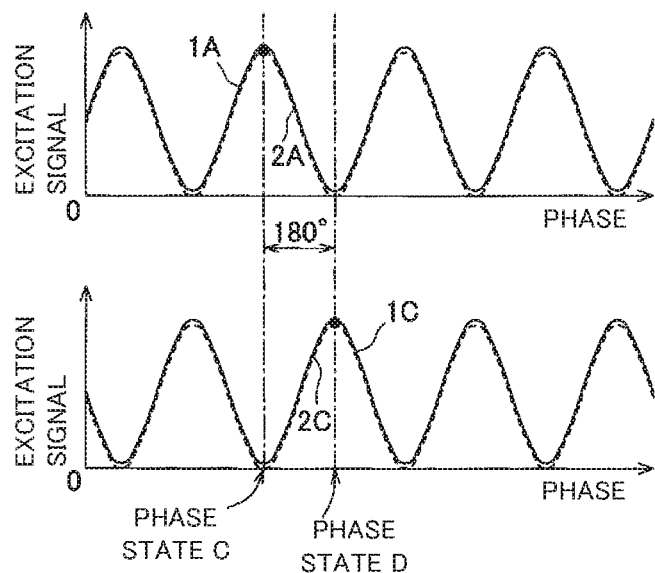
FIG. 8A is a graph showing waveforms of excitation signals when a bending mode is excited.
Figure 8B:
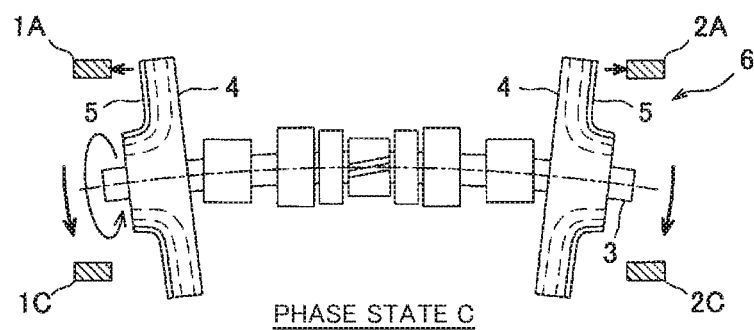
FIG. 8B is a side view of the centrifugal compressor showing how the rotor vibrates when the bending mode is excited.
Figure 8C:
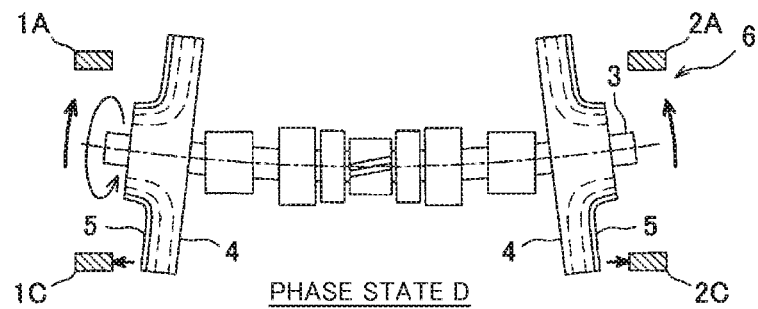
FIG. 8C is a side view of the centrifugal compressor showing how the rotor vibrates when the bending mode is excited.

FIG. 8A is a graph showing waveforms of excitation signals to the magnetic force generators 1 and 2 when the bending mode is excited. When the bending mode is excited, as when the rigid mode is excited, the impellers 4 are each excited by a pair of magnetic force generators arranged at a 180 degree interval in the rotational direction of the impellers 4 (e.g. the magnetic force generators 1A and 1C and the magnetic force generators 2A and 2C).

A state in FIG. 8B and a state in FIG. 8C are referred to as a phase state C and a phase state D, respectively. It is shown in the graph in FIG. 8A in what states excitation signals to the magnetic force generators 1A, 1C, 2A and 2C are when the vibration state corresponds to the phase state C or the phase state D. As shown in FIG. 8A, the pairs of magnetic force generators arranged at a 180 degree interval in the rotational direction of the rotor 6, that is, the magnetic force generators 1A and 1C and the magnetic force generators 2A and 2C are alternately operated. Excitation signals to each pair of magnetic force generators oppositely disposed in the axial direction of the rotor 6, that is, the magnetic force generators 1A and 2A and the magnetic force generators 1C and 2C are made in phase. This can effectively excite the bending mode.

Next, with reference to FIGS. 9A to 10B, a case where a backward rotation mode or a forward rotation mode is excited will be described.

Figure 9A:
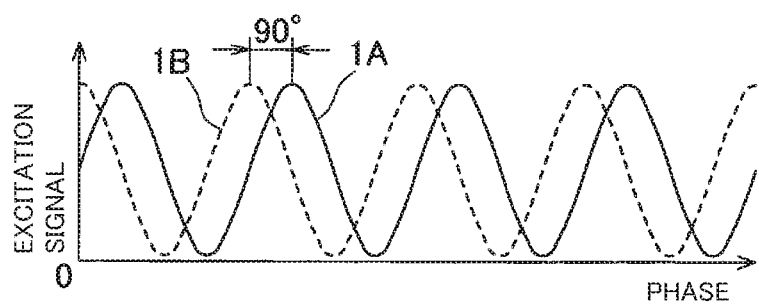
FIG. 9A is a graph showing waveforms of excitation signals when a backward rotation mode is excited.
Figure 9B:
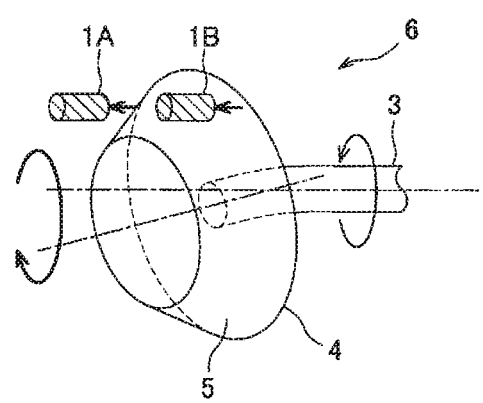
FIG. 9B is an explanatory diagram showing how the rotor vibrates when the backward rotation mode is excited.
Figure 10A:
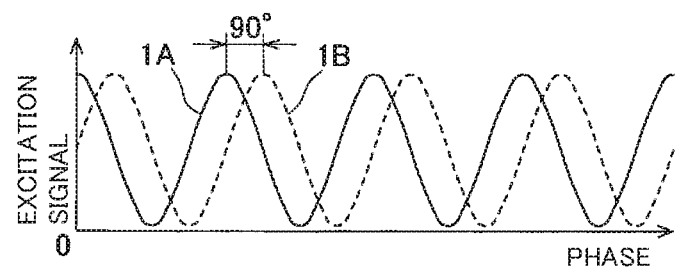
FIG. 10A is a graph showing waveforms of excitation signals when a forward rotation mode is excited.
Figure 10B:
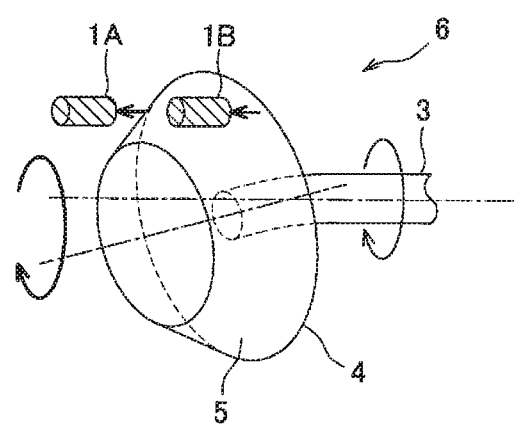
FIG. 10B is an explanatory diagram showing how the rotor vibrates when the forward rotation mode is excited.

The backward rotation mode is, as shown in FIG. 9B, a vibration mode in which wobble of the rotating shaft 3 (rotor 6) is in a direction opposite to the rotational direction of the rotating shaft 3 (rotor 6). In contrast, the forward rotation mode is, as shown in FIG. 10B, a vibration mode in which wobble of the rotating shaft 3 (rotor 6) is in the same direction as the rotational direction of the rotating shaft 3 (rotor 6).

FIG. 9A is a graph showing waveforms of excitation signals to the magnetic force generators 1 when the backward rotation mode is excited. FIG. 10A is a graph showing waveforms of excitation signals to the magnetic force generators 1 when the forward rotation mode is excited. When the backward rotation mode or the forward rotation mode is excited, the impeller 4 is excited by two magnetic force generators arranged at a 90 degree interval in the rotational direction of the impeller 4 (e.g. the magnetic force generators 1A and 1B).

As shown in FIGS. 9A and 10A, relative to an excitation signal to one of the magnetic force generators 1A and 1B arranged at a 90 degree interval in the rotational direction of the rotor 6 (e.g. the magnetic force generator 1A), the phase of an excitation signal to the other (e.g. the magnetic force generator 1B) is shifted by 90 degrees. This can effectively excite the backward rotation mode and the forward rotation mode.

Next, with reference to FIGS. 11A and 11B, a forward-rotation rigid mode will be described. The forward-rotation rigid mode is, as shown in FIG. 11B, a rigid mode in which the rotating shaft 3 rotates in a forward rotation direction. The backward-rotation rigid mode is a rigid mode in which the rotating shaft 3 rotates in a backward rotation direction. The backward-rotation bending mode is a bending mode in which the rotating shaft 3 rotates in a backward rotation direction, and the forward-rotation bending mode is a bending mode in which the rotating shaft 3 rotates in a forward rotation direction.

Figure 11A:
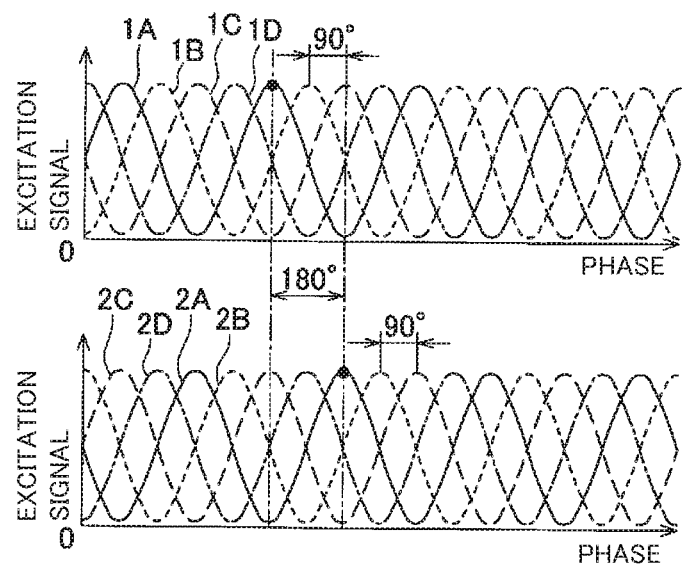
FIG. 11A is a graph showing waveforms of excitation signals when a forward-rotation rigid mode is excited.
Figure 11B:
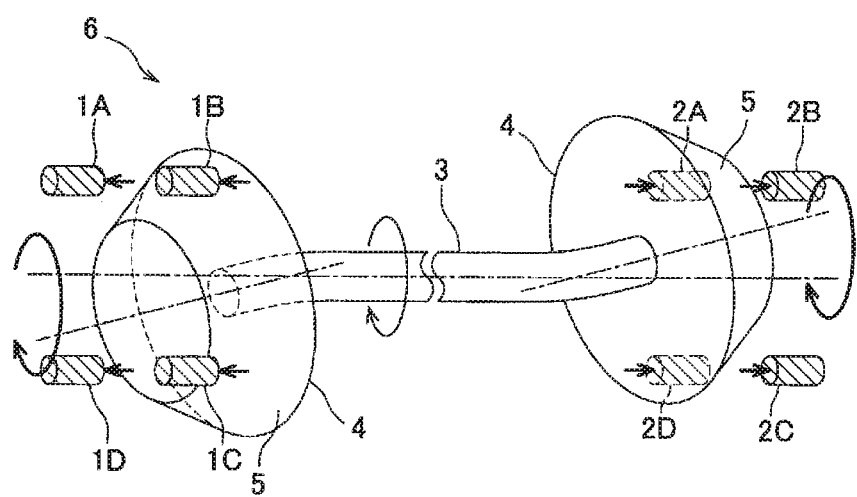
FIG. 11B is an explanatory diagram showing how the rotor vibrates when the forward-rotation rigid mode is excited.

FIG. 11A is a graph showing waveforms of excitation signals to the magnetic force generators 1 and 2 when the forward-rotation rigid mode is excited. When the forward-rotation rigid mode, the backward-rotation rigid mode, the backward-rotation bending mode, or the forward-rotation bending mode is excited, the impellers 4 are excited by all the magnetic force generators 1A to 1D and 2A to 2D arranged at 90 degree intervals in the rotational direction of the impellers 4.

As shown in FIG. 11A, excitation signals to each set of magnetic force generators arranged at 90 degree intervals in the rotational direction of the rotor 6, that is, the magnetic force generators 1A to 1D and the magnetic force generators 2A to 2D are each shifted in phase by 90 degrees in a rotational direction in which to excite (to wobble) the rotating shaft 3. This can effectively excite the forward rotation mode (or the backward rotation mode). Further, by making excitation signals to each pair of magnetic force generators oppositely disposed in the axial direction of the rotor 6, that is, the magnetic force generators 1A and 2A, the magnetic force generators 1B and 2B, the magnetic force generators 1C and 2C, and the magnetic force generators 1D and 2D in opposite phases (or in phase), the rigid mode (or the bending mode) can be effectively excited. By combining them, the backward-rotation rigid mode, the forward-rotation rigid mode, the backward-rotation bending mode, and the forward-rotation bending mode can be excited.

<Flow of Dynamic Characteristic Measurement on Rotor>

FIG. 12 is a flowchart of dynamic characteristic measurement on the rotor 6 performed by the dynamic characteristic measurement device 20. Excitation signals are output from the excitation controller 21 (step S1), and fed to the amplifier 22. The amplifier 22 is connected to the magnetic force generators 1A to 1D. Excitation signals fed to the magnetic force generators 1A to 1D are amplified by the amplifier 22. A method of driving the magnetic force generators 1A to 1D may be sweep excitation that varies excitation frequency or impulse excitation that applies impulsive inputs, for example.

The rotor 6 is excited by magnetic force (magnetic attractive force) generated by the magnetic force generators 1A to 1D. Vibration response of the rotor 6 (rotating shaft 3) to the excitation force is detected by the vibration detectors 15 and 16 (step S2).

Excitation signals from the excitation controller 21 and vibration signals detected by the vibration detectors 15 and 16 are fed to the signal measuring instrument 23. The signal measuring instrument 23 appropriately converts the excitation signals and the vibration signals into a form suitable for processing by the arithmetic unit 24, and then sends them to the arithmetic unit 24.

The arithmetic unit 24 performs frequency analysis on excitation signal data and vibration signal (vibration response signal) data sent from the signal measuring instrument 23, and calculates a function of transfer from an excitation signal to vibration response (step S3).

In the frequency analysis, an excitation signal x(t) and a vibration response signal y(t), which are time-history data, are converted into input spectral data X(f) and response spectral data Y(6 by generally known discrete Fourier transform (DFT) processing or fast Fourier transform (FFT) processing, for example. Here, t represents time [s], and f represents frequency [Hz].

An example of conversion of the time-history data x(t) into the spectral data X(f) by DFT processing is shown in the following expression:

$$X(n) = \sum_{m=0}^{N-1} x(m)\exp\left(-\frac{2\pi j}{N}nm\right) n = 0, \ldots, N-1 \quad \text{[Expression 1]}$$

where N is the number of data pieces to be analyzed, m is a number representing the mth data piece in a time-history data string, n is a number representing the nth data piece in a spectral data string, n is the circumference ratio, and j is the imaginary unit.

The relationship between the time t and the data number m of the time-history data is expressed by $t=m\Delta t$ where $\Delta t$ is the time interval of the data. The relationship between the frequency f and the data number n of the spectral data is expressed by $f=\Delta fn$ where $\Delta f=1/(N\Delta t)$ is the frequency interval of the data.

Using the input spectral data X(f) and the response spectral data Y(f) obtained by the frequency analysis, a transfer function G(f) is calculated by the following expression:

$$G(f) = \frac{Y(f)}{X(f)} \quad \text{[Expression 2]}$$

By the arithmetic unit 24 applying a differential iteration method or the Eigensystem realization algorithm (ERA), for example, known as a mode analysis method to the calculated transfer function G(f), the natural vibration frequency, the damping ratio, and the vibration mode are determined (step S4). The damping ratio is an example of dynamic characteristics of the rotor 6.

Figure 13A:
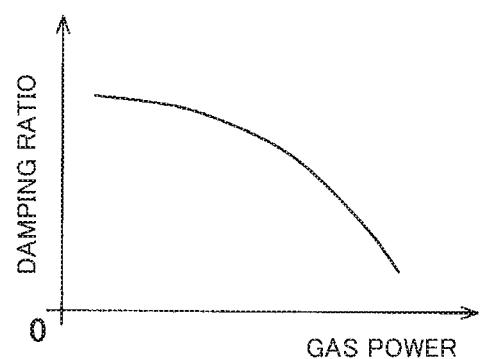
FIG. 13A is a graph for explaining a method of evaluating rotational stability.
Figure 13B:
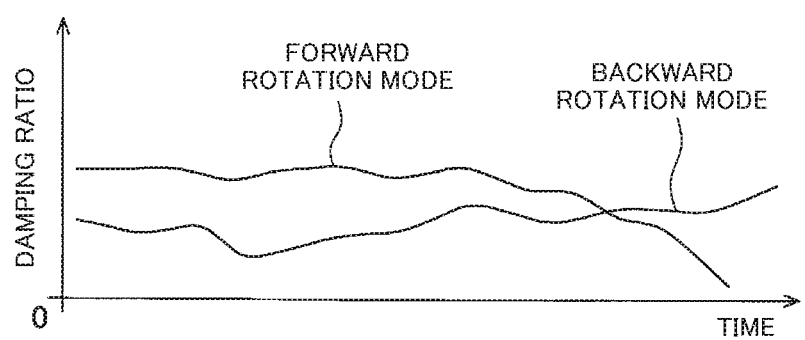
FIG. 13B is a graph for explaining a method of evaluating rotational stability.

The calculated damping ratio in each vibration mode is plotted on a graph (step S5). Then, the rotational stability of the rotor 6 (shaft vibration system) is evaluated from the calculated damping ratio in each vibration mode. As a method of evaluating the rotational stability, changes in the damping ratio with respect to the compressor load can be evaluated with a graph with gas power on the horizontal axis and the damping ratio on the vertical axis, for example (see FIG. 13A). Alternatively, state monitoring during actual operation of the compressor is possible with a graph with time on the horizontal axis and the damping ratio on the vertical axis (see FIG. 13B). When the damping ratio approaches zero in FIGS. 13A and 13B, the risk of destabilizing the rotation of the rotor 6 is increased. Thus, the present technique enables a decision to avoid such an operating condition, to take a measure to increase the damping of the rotor 6, or the like.

Functions and Effects

According to the above embodiment, the magnetic force generators 1 and 2 are disposed opposite to the covers 5 attached to the suction sides of the impellers 4. Thus, by the magnetic force generators 1 and 2 exerting magnetic attractive force on the covers 5, the impellers 4 can be excited by magnetic force. Typically, various machine components such as the seal 9 and the bearing 8 are disposed on the back side (opposite to the suction side) of each impeller 4, whereas such machine components are not often disposed in a region opposite to the cover 5. Therefore, even when the magnetic force generators 1 and 2 cannot be disposed on the back sides of the impellers 4, the magnetic force generators 1 and 2 can be placed suitably.

In the present embodiment, the magnetic force generators 1 and 2 are disposed opposite to the suction-side surfaces 5*a* of the covers 5 (thick line portions in FIG. 3). When the magnetic force generators 1 and 2 are disposed on the back sides of the impellers 4 as are conventionally done, differential pressure between pressure on the discharge sides of the impellers 4 and atmospheric pressure acts on the magnetic force generators 1 and 2. Thus, the magnetic force generators 1 and 2 with high pressure resistance are required. In contrast, when the magnetic force generators 1 and 2 are provided on the suction sides as in the present embodiment, only differential pressure between pressure on the discharge sides and pressure on the suction sides of the impellers 4 acts. Thus, pressure acting on the magnetic force generators 1 and 2 can be decreased. As a result, the pressure resistance of the magnetic force generators 1 and 2 can be reduced. Further, pressure acting on the seals 14 shown in FIG. 3 decreases, thus providing an advantage that the seals 14 can be simple ones.

Further, in the present embodiment, the magnetic force generators 1 and 2 are disposed along the axial direction to be opposite to the outer peripheral edge portions 5*b* of the suction-side surfaces 5*a* of the covers 5. This disposition enables excitation of outer peripheral portions of the impellers 4, increasing bending moment by magnetic force, compared to excitation of portions closer to the rotating shaft 3. As a result, excitation of the rotor 6 for greater shaft vibration response becomes possible.

Further, in the present embodiment, as described with reference to FIGS. 4A to 4E, the distance between the magnetic force acting surface 1*d* of each magnetic force generator 1 opposite to the cover 5 and the magnetic force acted-on surface 5*b* of the cover 5 opposite to the magnetic force acting surface 1*d* can be made uniform. This results in elimination of a widened-gap portion between the magnetic force acting surface 1*d* and the magnetic force acting surface 1*d*, allowing magnetic attractive force generated by the magnetic force generators 1 to be effectively exerted on the cover 5.

Further, in the present embodiment, as described with reference to FIGS. 5A to 5C, the dimension of each magnetic force generator 1 in the rotational direction of the impeller 4 is made larger than the dimension of the magnetic force generator 1 in the direction orthogonal to the rotational direction in a cross section orthogonal to the longitudinal direction of the magnetic force generator 1. This can effectively increase the cross-sectional area of each magnetic force generator 1, and can increase magnetic attractive force.

Further, in the present embodiment, the magnetic force generators 1 and 2 are arranged at 90 degree intervals in the rotational direction. Thus, by exciting the impellers 4 with appropriate ones selected among them, the rigid mode, the bending mode, the backward rotation mode, and the forward rotation mode, and further, combinations of them, the backward-rotation rigid mode, the forward-rotation rigid mode, the backward-rotation bending mode, and the forward-rotation bending mode can be excited individually.

OTHER EMBODIMENTS

The present invention is not limited to the above embodiment. The components in the above embodiment can be combined appropriately, or various modifications can be made thereto without departing from the scope of the present invention.

For example, in the above embodiment, the magnetic force generators 1 are disposed along the axial direction to be opposite to the outer peripheral edge portion 5*b* of the suction-side surface 5*a* of the cover 5. However, the disposition of the magnetic force generators 1 can take various modifications as shown in FIG. 14A to 14D.

Figure 14A:
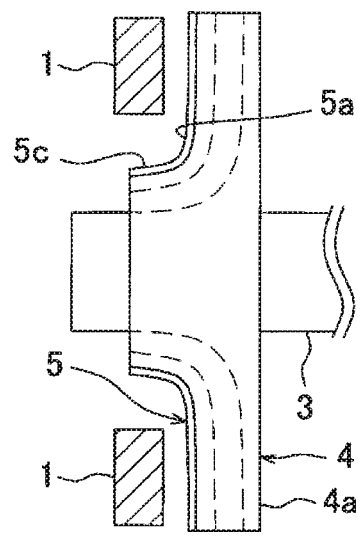
FIG. 14A is a side view showing a modification of the disposition of the magnetic force generators.

In FIG. 14A, the magnetic force generators 1 are disposed along the radial direction to be opposite to a suction-side edge portion 5*c* of the suction-side surface 5*a* of the cover 5. This disposition allows the magnetic force generators 1 to excite the rotor 6 on the shaft-end side apart from the bearing 8 (see FIG. 1), and thus can obtain greater shaft vibration response.

Figure 14B:
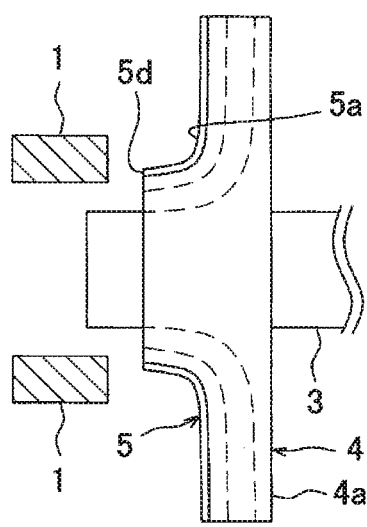
FIG. 14B is a side view showing a modification of the disposition of the magnetic force generators.
Figure 14C:
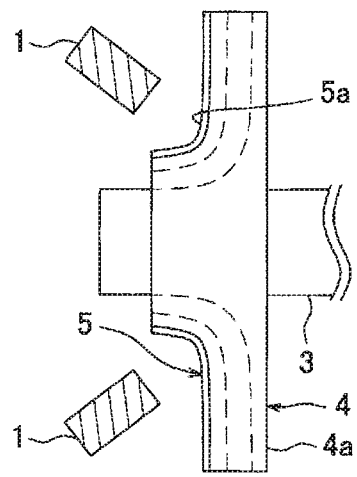
FIG. 14C is a side view showing a modification of the disposition of the magnetic force generators.
Figure 14D:
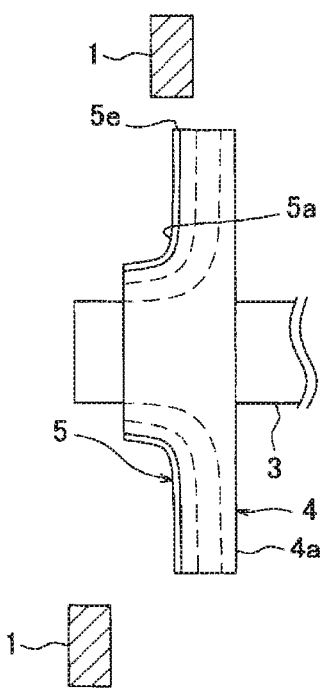
FIG. 14D is a side view showing a modification of the disposition of the magnetic force generators.

Other than this, as shown in FIG. 14B, the magnetic force generators 1 may be disposed along the axial direction to be opposite to a suction-side end face 5*d* of the suction-side surface 5*a* of the cover 5. Alternatively, as shown in FIG. 14C, the magnetic force generators 1 may be disposed obliquely at an angle from the axial direction to be opposite to the suction-side surface 5*a* of the cover 5. Alternatively, as shown in FIG. 14D, the magnetic force generators 1 may be disposed along the radial direction to be opposite to a radially outer discharge-side end face 5*e*, instead of the suction-side surface 5*a* of the cover 5. Other than those described here, any dispositions in which the magnetic force generators 1 are disposed opposite to the cover 5 can be used as a matter of course.

Here, when the magnetic force generators 1 are disposed along the radial direction as shown in FIG. 14A, for example, the dimension of each magnetic force generator 1 in the rotational direction of the impeller 4 is made larger than the dimension of the magnetic force generator 1 in the axial direction (direction orthogonal to the rotational direction) in a cross section orthogonal to the longitudinal direction of the magnetic force generator 1. This can increase magnetic attractive force. FIGS. 15A to 17B show the cross-sectional shape of each magnetic force generator 1 along the longitudinal direction thereof (FIGS. 15A, 16A, and 17A) and the cross-sectional shape of each magnetic force generator 1 orthogonal to the longitudinal direction thereof (FIGS. 15B, 16B, and 17B) when the magnetic force generators 1 are disposed along the radial direction.

Figure 15A:
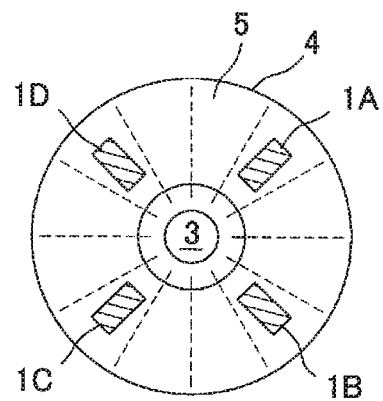
FIG. 15A is a cross-sectional view showing a cross-sectional shape of the magnetic force generators along the longitudinal direction thereof.
Figure 15B:
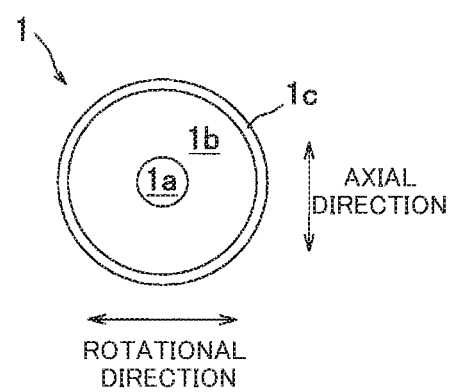
FIG. 15B is a cross-sectional view showing a cross-sectional shape of each magnetic force generator orthogonal to the longitudinal direction thereof.
Figure 16A:
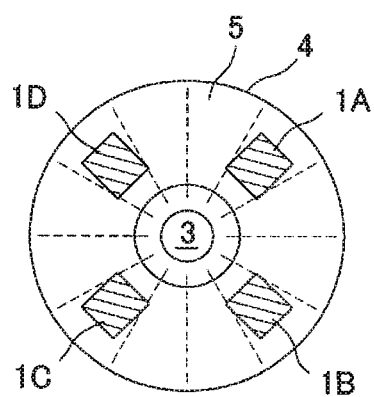
FIG. 16A is a cross-sectional view showing a cross-sectional shape of the magnetic force generators along the longitudinal direction thereof.
Figure 16B:
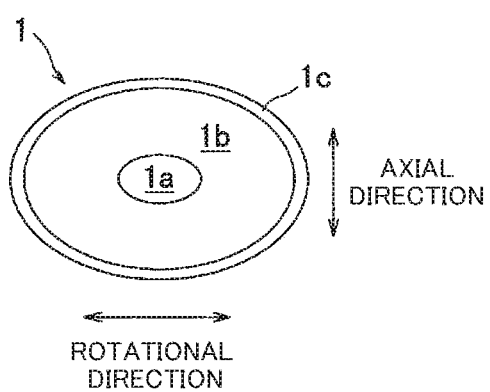
FIG. 16B is a cross-sectional view showing a cross-sectional shape of each magnetic force generator orthogonal to the longitudinal direction thereof.
Figure 17A:
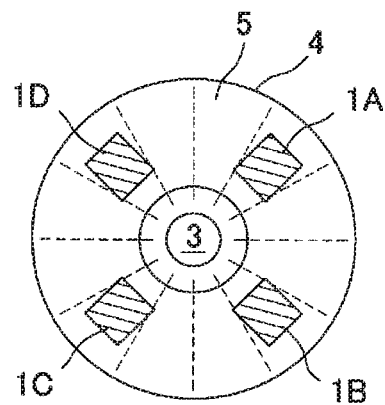
FIG. 17A is a cross-sectional view showing a cross-sectional shape of the magnetic force generators along the longitudinal direction thereof.
Figure 17B:
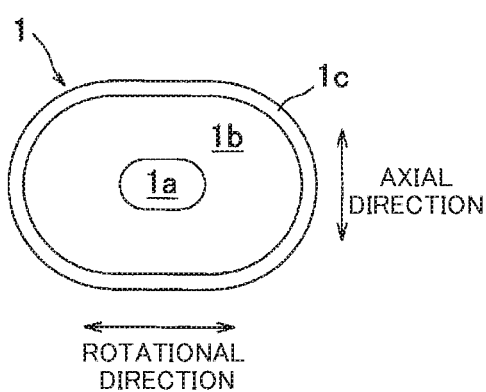
FIG. 17B is a cross-sectional view showing a cross-sectional shape of each magnetic force generator orthogonal to the longitudinal direction thereof.

The magnetic force generators 1 are generally circular in the cross-sectional shape orthogonal to the longitudinal direction thereof as shown in FIGS. 15A and 15B. The cross-sectional shape may be an elliptical shape having the major axis in the rotational direction and the minor axis in the axial direction as shown in FIGS. 16A and 16B, or may be an oblong shape extending in the rotational direction as shown in FIGS. 17A and 17B. By making the cross-sectional shape elliptical or oblong, the cross-sectional area of the magnetic force generators 1 can be efficiently increased, preventing the magnetic force generators 1 from partially extending off greatly from the axial end face of the cover 5, compared to when the cross-sectional shape is circular. This can increase magnetic attractive force. However, it is not essential to make the cross-sectional shape of the magnetic force generators 1 elliptical or oblong.

Figure 18:
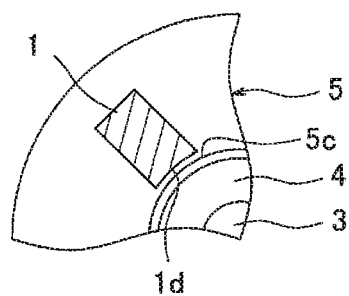
FIG. 18 is an explanatory diagram showing a magnetic force acting surface and a magnetic force acted-on surface as viewed from an axial direction.

Further, when the magnetic force generators 1 are disposed along the radial direction as shown in FIGS. 15A, 16A, and 17A, the magnetic force acting surface 1*d* of each magnetic force generator 1 is formed in an arc shape as viewed from the axial direction as shown in FIG. 18. This allows the magnetic force acting surface 1*d* to be in conformance with a magnetic force acted-on surface 5c (the suction-side edge portion, a peripheral surface of the cover 5) in a circumferential direction, and can increase the degree of uniformity in the distance between the magnetic force acting surface 1d and the magnetic force acted-on surface 5b. As a result, magnetic attractive force generated by the magnetic force generators 1 can be effectively exerted on the cover 5.

This application is based on Japanese Patent Application (JP 2015-180798) filed on Sep. 14, 2015, which is incorporated herein by reference.

EXPLANATION OF REFERENCE NUMERALS 1 (1A to 1D) magnetic force generator
1d magnetic force acting surface
2 (2A to 2D) magnetic force generator
3 rotating shaft
4 impeller
5 cover
5a suction-side surface
5b outer peripheral edge portion (magnetic force acted-on surface)
5c suction-side edge portion
6 rotor
15, 16 vibration detector
20 dynamic characteristic measurement device
21 excitation controller
24 arithmetic unit
100 centrifugal rotating machine (built-in gear type centrifugal compressor)

The invention claimed is:

1. A device for measuring dynamic characteristics of a centrifugal rotating machine that includes a rotor with an impeller mounted on a shaft end portion of a rotating shaft extending in an axial direction, the impeller rotating in a rotational direction around the rotating shaft to suck fluid from an inlet on a suction side in the axial direction and discharge the fluid from an outer side in a radial direction, the device comprising:
   magnetic force generators that excite the impeller by magnetic force;
   an excitation controller that drives the magnetic force generators;
   a vibration detector that detects vibrations of the rotating shaft; and
   an arithmetic unit that performs frequency analysis and mode analysis based on an excitation signal from the excitation controller and a vibration signal from the vibration detector to calculate dynamic characteristics of the rotor, wherein
   a cover attached to the suction side of the impeller for covering the impeller while leaving the inlet free, and the magnetic force generators are disposed opposite to the cover and the suction-side surface of the impeller.

2. The device for measuring dynamic characteristics of the centrifugal rotating machine according to claim 1, wherein the magnetic force generators are disposed opposite to a suction-side surface of the cover.

3. The device for measuring dynamic characteristics of the centrifugal rotating machine according to claim 2, wherein the magnetic force generators are disposed along the radial direction to be opposite to a suction-side edge portion of the suction-side surface of the cover.

4. The device for measuring dynamic characteristics of the centrifugal rotating machine according to claim 2, wherein the magnetic force generators are disposed along the axial direction to be opposite to an outer peripheral edge portion of the suction-side surface of the cover.

5. The device for measuring dynamic characteristics of the centrifugal rotating machine according to claim 1, wherein a member made of a magnetic substance or a good conductor is attached to the cover.

6. The device for measuring dynamic characteristics of the centrifugal rotating machine according to claim 1, wherein a distance between a magnetic force acting surface of each magnetic force generator opposite to the cover and a magnetic force acted-on surface of the cover opposite to the magnetic force acting surface is uniform.

7. The device for measuring dynamic characteristics of the centrifugal rotating machine according to claim 1, wherein a dimension of each magnetic force generator in the rotational direction is larger than a dimension of the magnetic force generator in a direction orthogonal to the rotational direction in a cross section orthogonal to a longitudinal direction of the magnetic force generator.

8. The device for measuring dynamic characteristics of the centrifugal rotating machine according to claim 1, wherein the magnetic force generators are arranged at 90 degree intervals in the rotational direction.

9. The device for measuring dynamic characteristics of the centrifugal rotating machine according to claim 2, wherein a member made of a magnetic substance or a good conductor is attached to the cover.

10. The device for measuring dynamic characteristics of the centrifugal rotating machine according to claim 3, wherein a member made of a magnetic substance or a good conductor is attached to the cover.

11. The device for measuring dynamic characteristics of the centrifugal rotating machine according to claim 4, wherein a member made of a magnetic substance or a good conductor is attached to the cover.

12. The device for measuring dynamic characteristics of the centrifugal rotating machine according to claim 2, wherein a distance between a magnetic force acting surface of each magnetic force generator opposite to the cover and a magnetic force acted-on surface of the cover opposite to the magnetic force acting surface is uniform.

13. The device for measuring dynamic characteristics of the centrifugal rotating machine according to claim 3, wherein a distance between a magnetic force acting surface of each magnetic force generator opposite to the cover and a magnetic force acted-on surface of the cover opposite to the magnetic force acting surface is uniform.

14. The device for measuring dynamic characteristics of the centrifugal rotating machine according to claim 4, wherein a distance between a magnetic force acting surface of each magnetic force generator opposite to the cover and a magnetic force acted-on surface of the cover opposite to the magnetic force acting surface is uniform.

15. The device for measuring dynamic characteristics of the centrifugal rotating machine according to claim 2, wherein a dimension of each magnetic force generator in the rotational direction is larger than a dimension of the magnetic force generator in a direction orthogonal to the rotational direction in a cross section orthogonal to a longitudinal direction of the magnetic force generator.

16. The device for measuring dynamic characteristics of the centrifugal rotating machine according to claim 3, wherein a dimension of each magnetic force generator in the rotational direction is larger than a dimension of the magnetic force generator in a direction orthogonal to the rotational direction in a cross section orthogonal to a longitudinal direction of the magnetic force generator.

17. The device for measuring dynamic characteristics of the centrifugal rotating machine according to claim 4, wherein a dimension of each magnetic force generator in the rotational direction is larger than a dimension of the magnetic force generator in a direction orthogonal to the rotational direction in a cross section orthogonal to a longitudinal direction of the magnetic force generator.

18. The device for measuring dynamic characteristics of the centrifugal rotating machine according to claim 2, wherein the magnetic force generators are arranged at 90 degree intervals in the rotational direction.

19. The device for measuring dynamic characteristics of the centrifugal rotating machine according to claim 3, wherein the magnetic force generators are arranged at 90 degree intervals in the rotational direction.

20. The device for measuring dynamic characteristics of the centrifugal rotating machine according to claim 4, wherein the magnetic force generators are arranged at 90 degree intervals in the rotational direction.

* * * * *